Figure 1:
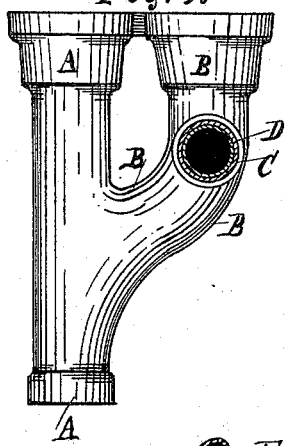

(No Model.)

A. C. STEWART.
METALLIC DRAINAGE FITTING.

No. 577,793. Patented Feb. 23, 1897.

Witnesses.
James Gardiner
N. S. Rollins

Inventor.
Alexander C. Stewart.
By St. John Day.
Attorney.

UNITED STATES PATENT OFFICE.

ALEXANDER C. STEWART, OF LOS ANGELES, CALIFORNIA.

METALLIC DRAINAGE-FITTING.

SPECIFICATION forming part of Letters Patent No. 577,793, dated February 23, 1897.

Application filed July 18, 1896. Serial No. 599,731. (No model.)

*To all whom it may concern:*

Be it known that I, ALEXANDER C. STEWART, a citizen of the United States, residing in the city of Los Angeles, in the county of Los Angeles and State of California, have invented certain new and useful Improvements in Metallic Drainage-Fittings, of which the following is a full, clear, and exact description or specification, reference being had to the annexed sheet of drawings, forming part of this specification, and to the letters marked thereon.

My invention, which relates to certain new and useful improvements in metallic drainage-fittings, has a twofold object.

The first object of my invention is to construct in one piece that part of a soil-pipe and the branch connected thereto to which the trap or cesspool of a washbasin, bath, or other equivalent receptacle is attached, and thereby to simplify and reduce the cost of such drainage-fittings. This object of my invention I carry out by casting a length of soil-pipe with the aforesaid branch in one piece and by having an opening in the side of the branch whereto the pipe leading from the trap or cesspool is connected. The upper part of the branch is formed with a faucet or hub to receive the lower end of the ventilating-pipe which leads to the roof of the building wherein my improved drainage-fittings are used; and the upper end of that piece of soil-pipe in connection with the aforesaid branch is formed with a faucet or hub for connecting the section of soil-pipe above it, while the lower portion of said soil-pipe is formed to connect with the faucet or hub of the next portion of soil-pipe below. In place of the aforesaid branch being formed with the connection for the trap or cesspool on one side only it may be formed with a similar connection on both sides, and a diaphragm is used in the branch across that part whereinto the discharge from the trap or cesspool takes place.

The second object of my invention is to get rid of soldered or wiped joints between the metallic pipes constituting and leading from the trap or cesspool and the branch into which the trap or cesspool discharges and to substitute non-soldered joints therefor. This object of my invention is carried out by inserting a screwed thimble into the opening on the side of the branch of the aforesaid metallic drainage-fitting and by inserting the end of the lead or other pipe into the said thimble, the joint between the pipe and the thimble being made tight by the use of elastic packing compressed upon the outer end of the thimble and around the pipe by means of a union-nut.

Figure 2:
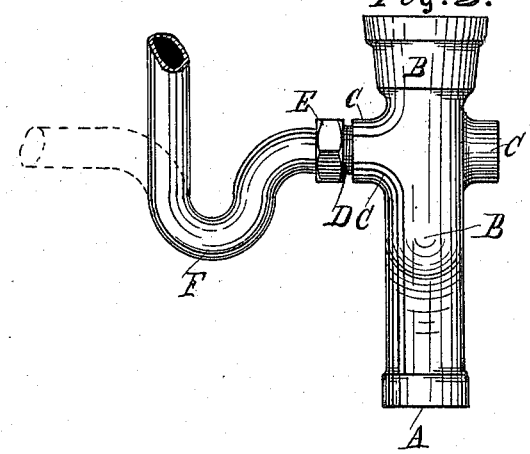
Figure 3:
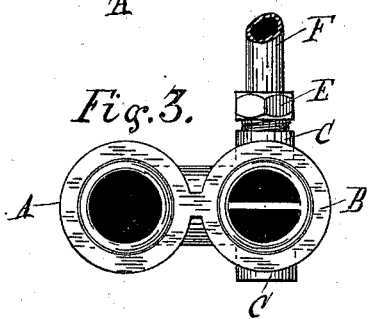
Figure 4:
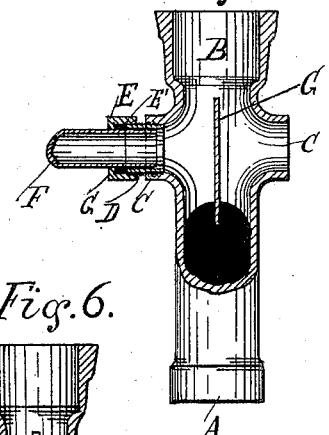
Figure 5:
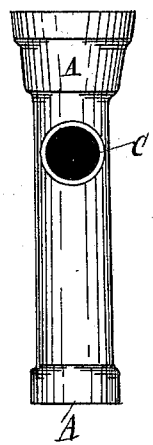
Figure 6:
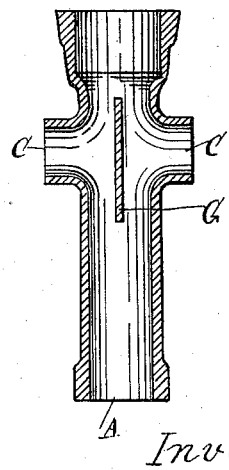

On the annexed sheet of drawings, Figure 1 is a side elevation of the improved drainage-fitting constructed in accordance with the first object of my invention. Fig. 2 is a front elevation of the same, showing the trap or cesspool leading from the washbasin, bath, or other receptacle connected thereto. Fig. 3 is a plan corresponding with Figs. 1 and 2. Fig. 4 is in part a vertical section through the branch, showing the internal construction thereof and the connection with the soil-pipe. Fig. 5 is an elevation of the upper drainage-fitting of the soil-pipe to which a washbasin, bath, or other receptacle in the topmost story of a building is connected and wherein the branch hereinbefore referred to, and shown in Figs. 1, 2, 3, and 4, is rendered unnecessary. Fig. 6 is a vertical central section of Fig. 5.

In Figs. 1, 2, 3, and 4 the portion of the soil-pipe is marked A and the branch formed in one piece therewith is marked B. On one side of the branch B the tubular connecting-piece C is formed, being cast in one piece with the other portions of the improved drainage-fitting. Into this projection C a metallic thimble D is screwed, as shown more particularly at Figs. 1, 2, 3, and 4, and upon this thimble D the union-nut E is fitted, so as to be screwed thereon or unscrewed therefrom in the ordinary manner. A sufficient space is left between the flange at the outer end of the union-nut E, as shown at Fig. 4, to receive a ring of elastic or other suitable packing E′ between the flange of the nut E and the outer end of the thimble D, so that upon tightening the nut E the packing is compressed between the flange of the nut and the outer end of the thimble D. In this manner when the end of the pipe F, leading from the trap or cesspool, Figs. 2, 3, and 4, is passed through the union-nut E and into the thimble D, as more particularly shown at Fig. 4, the tightening of the nut E upon the thimble D so compresses the packing around the inserted end of the pipe F that a complete metallic joint is made between the trap or cesspool and the branch B without the use of a soldered or wiped joint, while the said joint is readily disconnected by unscrewing the nut E and withdrawing the end of the pipe F out from the thimble D.

As it sometimes happens that washbasins, baths, or other receptacles on either or both sides of a partition in a building are or require to be connected to the same soil-pipe, the branch B of my improved drainage-fitting is, when so required, formed with two connecting-pieces C, of which one is shown in full section and the other in dotted lines in Figs. 2, 3, and 4.

A diaphragm G is cast at that portion of the interior of the branch B whereat the connections C are situated, thus preventing the discharge from one of such connections in any way interfering with the discharge from the other of such connections.

In order to apply the second part of my invention in the simplest manner to the washbasins, baths, or other receptacles in the topmost story of a building, it is not necessary in such case to use the improved drainage-fitting constructed with the branch B, as shown at Figs. 1 to 4, but in lieu thereof to substitute a portion of soil-pipe constructed as shown at Figs. 5 and 6 of the annexed drawings, in which case the unsoldered connections C for the pipes leading from the traps of the washbasins, baths, or other receptacles are formed on either side of the section of soil-pipe used for leading to the outside of the roof at the top of the building, and in this manner the discharge from the said basins, baths, or other receptacles takes place into the soil-pipe direct, without the intervention of the branch B required in the stories below.

It is here explained that each branch B for each story or floor of a building is connected by means of a ventilating-pipe jointed to the faucet or hub at its upper end and leading to the roof, so as to insure complete ventilation from each such connection, the pipes leading from the faucets of the branches B being each constructed with an offset, as is well understood, for enabling the ventilating-pipes to pass to the roof without interfering with each other.

Having now described the nature of my said invention and the best system, mode, or manner which I am at present acquainted with for carrying the same into practical effect, I desire to observe, in conclusion, that although I have upon the annexed drawings shown my improvements as applicable to plumbing-work in which ordinary calked joints are used, yet it is to be understood that my improvements are equally applicable to plumbing-work in which what is commonly known as the "Durham" system is used, wherein the joints are screwed joints, and that what I consider to be novel and original, and therefore claim as the invention to be secured to me by Letters Patent, is as follows:

1. The improved drainage-fitting consisting of a portion of soil-pipe, a ventilating branch leading from said soil-pipe, the connection or connections on the side or sides of said ventilating branch, the diaphragm or partition having its flat sides facing the discharge ends of the laterally-connected traps, the whole being formed or cast in one piece, substantially as set forth and shown in the annexed drawings.

2. The improved drainage-fittings, consisting of the combination of a portion of soil-pipe, a ventilating branch, lateral openings in the ventilating branch, a diaphragm within the ventilating branch opposite the lateral openings, the discharge-pipes and traps or cesspools connected to said lateral openings, all operating together in the manner and for the purposes substantially as set forth.

In testimony whereof I, the said ALEXANDER C. STEWART, have hereunto set my hand in the presence of two subscribing witnesses.

ALEXANDER C. STEWART.

Witnesses:
JAMES GARDINER,
ST. JOHN DAY.